United States Patent [19]

Hill et al.

[11] Patent Number: 4,520,302
[45] Date of Patent: May 28, 1985

[54] STEPPING MOTORS AND DRIVE CIRCUITS THEREFOR

[75] Inventors: Roland J. Hill, Cambridge; Paul P. Acarnley, Weston Colville, both of England

[73] Assignee: National Research Development Corporation, London, England

[21] Appl. No.: 588,225

[22] Filed: Mar. 12, 1984

[30] Foreign Application Priority Data

Mar. 15, 1983 [GB] United Kingdom ............... 8307047

[51] Int. Cl.$^3$ ............................................. H02K 29/04
[52] U.S. Cl. .................................. 318/696; 318/685
[58] Field of Search ............................ 318/696, 685

[56] References Cited

U.S. PATENT DOCUMENTS

| | | | |
|---|---|---|---|
| 4,065,708 | 12/1977 | Ulland et al. ............... | 318/685 |
| 4,072,888 | 2/1978 | Bechtle et al. .............. | 318/685 |
| 4,303,871 | 12/81 | Berry ........................... | 318/138 |

FOREIGN PATENT DOCUMENTS

| | | |
|---|---|---|
| 2089124 | 1/1972 | France . |
| 1274360 | 5/1972 | United Kingdom . |
| 1513044 | 6/1978 | United Kingdom . |
| 2003677 | 3/1979 | United Kingdom . |
| 2004141 | 3/1979 | United Kingdom . |
| 1597379 | 9/1981 | United Kingdom . |
| 2094559 | 9/1982 | United Kingdom . |
| 2111331 | 6/1983 | United Kingdom . |
| 2119589 | 11/1983 | United Kingdom . |
| 2119185 | 11/1983 | United Kingdom . |

Primary Examiner—S. J. Witkowski
Assistant Examiner—Saul M. Bergmann
Attorney, Agent, or Firm—Cushman, Darby & Cushman

[57] ABSTRACT

In a stepping motor having phase windings A, B, etc. the current through the phase windings is switched by a drive circuit including switching transistors $T1_A$, $T1_B$ etc. in series with each individual phase winding. The transistors are controlled by a phase sequence logic circuit 14. A current flow characteristic is indicative of rotor position and is measured and used to operate the phase sequence logic circuit. The drive circuit may incorporate a chopper-type control operated through further transistors $T2_A$, $T2_B$ etc. also in series with each phase winding. The current flow characteristic that is measured may be current rise time, current decay time or chopping frequency. The current characteristic being monitored may be the characteristic in an energized winding or else in an unenergized winding at low current level. The drive circuit may alternatively provide a constant voltage power supply to the phase windings in sequence with current being repeatedly switched at a low level to an unenergized winding to monitor rotor position.

6 Claims, 16 Drawing Figures

STEPPING MOTORS AND DRIVE CIRCUITS THEREFOR

FIELD OF THE INVENTION

This invention relates to stepping motors and drive circuits therefor. It is concerned with stepping motors operating with closed-loop or rotor-position control.

BACKGROUND OF THE INVENTION

Closed-loop stepping motor control has the attractive properties of guaranteed step integrity and optimal performance for varying load conditions, but this form of control has failed to attain widespread popularity because existing methods of rotor position detection based on optical, inductive or capacitive effects or the Hall effect are expensive or unreliable. The same problem has also occurred in the development of switched reluctance motors where, in traction applications for example, an optical position encoder may be operating in a particularly harsh environment.

In an attempt to eliminate the optical encoder a so-called "waveform detection" of rotor position has been suggested. With this technique the modulating effect of the motional emf on the current waveform is measured and, since the instantaneous motional emf is dependent on rotor position, it is possible to deduce the rotor position. Waveform detection has the advantage of being low cost but is unreliable in most situations because, for example, it is unable to operate at low speeds where the motional emf component approaches zero. Furthermore it appears that waveform detection can only be applied to the series resistance/constant voltage drives, which are commonly used for small motors of less than 1 kW output.

Most large stepping and switched motors are driven by chopper-type circuits. Such circuits incorporate means for repeatedly chopping the electrical connection from the supply terminals to an excited phase winding when current flow has risen to a predetermined value, which will normally be higher than the rated current of the phase winding. The current flowing in the now disconnected phase winding decays through a by-pass circuit and the connection to the supply terminals is restored after a delay time, which may be the time for the current to decay to a predetermined lower value, normally lower than the rated current of the winding. Such a control may be termed a "bang-bang" current control and it functions to maintain the average current in an excited phase winding near its rated level. Because the average current is normally constant techniques of waveform detection for deducing the position of the rotor are inapplicable.

SUMMARY OF THE INVENTION

It is an object of the invention to provide a closed-loop control for a stepping motor without the need for additional electrical or mechanical connections to the motor.

According to the invention a drive circuit for a stepping motor having at least one stator phase winding comprises phase switching means associated with the or each phase winding for connecting its associated phase winding to supply terminals, and phase control means for operating the phase switching means, wherein means are provided for measuring a characteristic of current flow in the motor to derive an indication of rotor position, the value of the characteristic measured in said measuring means being used to operate the phase control means.

As applied to a motor with a chopper type drive circuit means are included for repeatedly chopping the electrical connection from the supply terminals to a phase winding when current flow in a phase winding has risen to a predetermined value, a by-pass circuit associated with each phase winding for allowing current flow through the winding to decay therethrough when the chopping means operates, and means for restoring the electrical connection from the supply terminals to a phase winding after a delay time. The delay time may be the time required for the current to decay to a predetermined value.

In carrying out the invention the characteristic of current flow that is measured may be a characteristic of current flow through an energized phase winding. Alternatively, a phase winding other than the energized phase winding may be supplied with a low level of current and a characteristic of that current flow may be measured. Alternatively again, additional windings may be provided wound on the same poles as the phase windings and a characteristic of current flow through the additional windings is measured.

In the case of a chopper type drive circuit the characteristic of the chopped current flow, whether through an energized or an unenergized winding, that is measured may be current rise time, current decay time or the chopping frequency.

In the case of a stepping motor switched by a constant voltage supply the characteristic of current flow that is measured may be the magnitude of the current switched to an unenergized winding after a predetermined time.

The invention is based on utilization of the fact that the inductance of a phase winding is dependent on rotor position and varies substantially sinusoidally from a maximum to a minimum as the rotor advances over a pole pitch. This dependence is modified at high current levels by a magnetic saturation and at high speeds by the effect of motional emf. Nevertheless, despite these modifying effects the variation of inductance causes corresponding variation in certain characteristics of current flow an appropriate one of which may be selected to derive an indication of rotor position and thus be used to provide closed-loop control.

BRIEF DESCRIPTION OF THE DRAWINGS

In order that the invention may be more fully understood reference will now be made to the corresponding drawings in which.

DETAILED DESCRIPTION OF THE INVENTION

Figure 1:
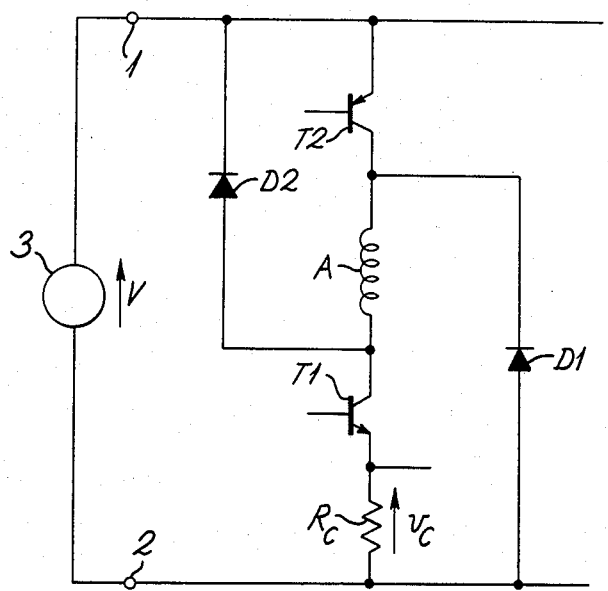
FIG. 1 is a circuit diagram of one phase of a known chopper drive circuit.

A circuit diagram for one phase winding A of a stepping motor is shown in FIG. 1. A supply source 3 to the stepping motor provides a unipolar or unidirectional voltage V between terminals 1 and 2 and winding A is connected in series with two transistors T1 and T2 to these terminals. Transistor T1 is controlled to switch the phase excitation to winding A and transistor T2 is controlled to chop the excitation current. A small resistor Rc is provided in series with the collector T1 and the voltage Vc dropped across this resistor acts as a monitor of the instantaneous phase current. A diode D1 is connected from terminal 2 in parallel with transistor T1 and winding A and a diode D2 is connected to terminal 1 in parallel with transistor T2 and winding A. Voltage V is of high value which if applied continuously to winding A would result in a current flow of many times the rated value. When winding A is first energized both transistors T1 and T2 conduct and the current through winding A builds up at a rate dictated by the effective inductance of the winding. When the phase current reaches a level which slightly exceeds the rated current transistor T2 is switched off to disconnect winding A from the supply and the inductive energy in winding A causes current to circulate around the closed path comprising winding A, transistor T1, resistor Rc and diode D1. This path has a high inductance and a low resistance and the current decays slowly. The value of the current is monitored by measurement of voltage Vc and when it has decayed to a predetermined value transistor T2 is turned on to restore the supply voltage V to the phase winding causing the current to rise again.

This cycle of operations repeats with chopping being effected by repeated turning on and off of transistor T2 until the end of the phase excitation interval is reached. When this occurs transistor T1 is switched off and the energy in the winding decays around a path which includes winding A, diodes D1 and D2 and the path between terminals 1 and 2 through the supply source 3. As this path includes the supply voltage V the current is forced rapidly to zero and a large proportion of the inductive energy stored in winding A is returned to the supply.

From the above description it is apparent that the rise and fall of phase current as T2 turns on and off occurs at a rate which is dictated by the phase inductance. In a variable-reluctance motor this phase inductance varies with rotor position and therefore the chopping characteristics of the drive circuit vary during the phase excitation interval. This effect is quantified below assuming initially that magnetic saturation does not occur at any rotor position and that the motor is operating at a speed where the motional emf is small in comparison to the supply voltage. A qualitative treatment of the modification required to deal with saturation and motional emf is presented later.

Throughout the analysis the effects of secondary coupled circuits in the stator and rotor iron have been neglected, because the motors under consideration are laminated and, in any case, the chopping characteristics are dominated by the highly-inductive multi-turn phase winding circuit, which has a much longer electrical time constant than any, effectively single-turn, circuit distributed over a lamination.

It is assumed in the analysis that the mutual inductance between phases is negligible, as is usually the case in motors where each phase winding is concentrated on separate stator teeth. In cases where there is significant mutual inductance between phases, the chopping characteristics may be modified by coupling between phases, but even in these situations the chopping characteristics remain position dependent and can be used as a basis for position detection.

In the absence of magnetic saturation, as occurs for operation below rated current, the self inductance of one phase of a variable-reluctance stepping motor can be approximated by a sinusoidal function of rotor position:

$$L_a = L_o + L_1 \sin p\theta \qquad (1)$$

where $L_a$ is the self inductance of winding A, $L_o$ is the average inductance thereof, $L_1$ is the fundamental component of inductance variation with rotor position, p is the number of rotor teeth and $\theta$ is the rotor position. The torque Ta produced by this phase, when carrying a current I equal to the average current in the excited phase is:

$$T_a = \tfrac{1}{2} I^2 dL_a/d\theta = \tfrac{1}{2} p I^2 L_1 \cos p\theta \qquad (2)$$

Now consider a time interval $t_{rise}$ in which the phase current rises from $(I - \delta I/2)$ to $(I + \delta I/2)$, as a result of the high supply voltage applied to the phase winding. Neglecting at present the motional emf, the phase voltage equation is:

$$V = Ri + L_a di/dt \qquad (3)$$

where i is the instantaneous value of current, resistance R includes the resistance of phase winding A and the monitoring resistance Rc. If the phase current excursion $\delta i$ is small enough to ensure approximately linear current changes, equation (3) can be re-written:

$$V = RI + L_a \delta I/t_{rise} \qquad (4)$$

substituting from equation (1) for $L_a$ and re-arranging:

$$t_{rise} = \frac{(L_o + L_1 \sin p\theta)\delta I}{V - RI} \qquad (5)$$

Similarly for a time interval $t_{decay}$ in which the phase current decays from $(I + \delta I/2)$ to $(-\delta I/2)$:

$$O = RI - L_a \delta I/t_{decay} \qquad (6)$$

and substituting from equation (1) for $L_a$:

$$t_{decay} = \frac{(L_o + L_1 \sin p\theta)\delta I}{RI} \qquad (7)$$

Finally, the instantaneous chopping frequency $f_{chop}$ can be found in terms of the rotor position:

$$f_{chop} = 1/(t_{rise} + t_{decay}) \qquad (8)$$

and substituting from equations (5) and (7):

$$f_{chop} = (V - RI)(RI)/V\delta I(L_o + L_1 \sin p\theta) \quad (9)$$

Equations (5), (7) and (9) show that current rise time, current decay time and chopping frequency all depend on rotor position, so any of these three parameters may be chosen for position detection. Typical variations of the parameters, along with the variations of phase induction and torque, over a complete rotor tooth pitch are shown in FIG. 2.

Figure 2:
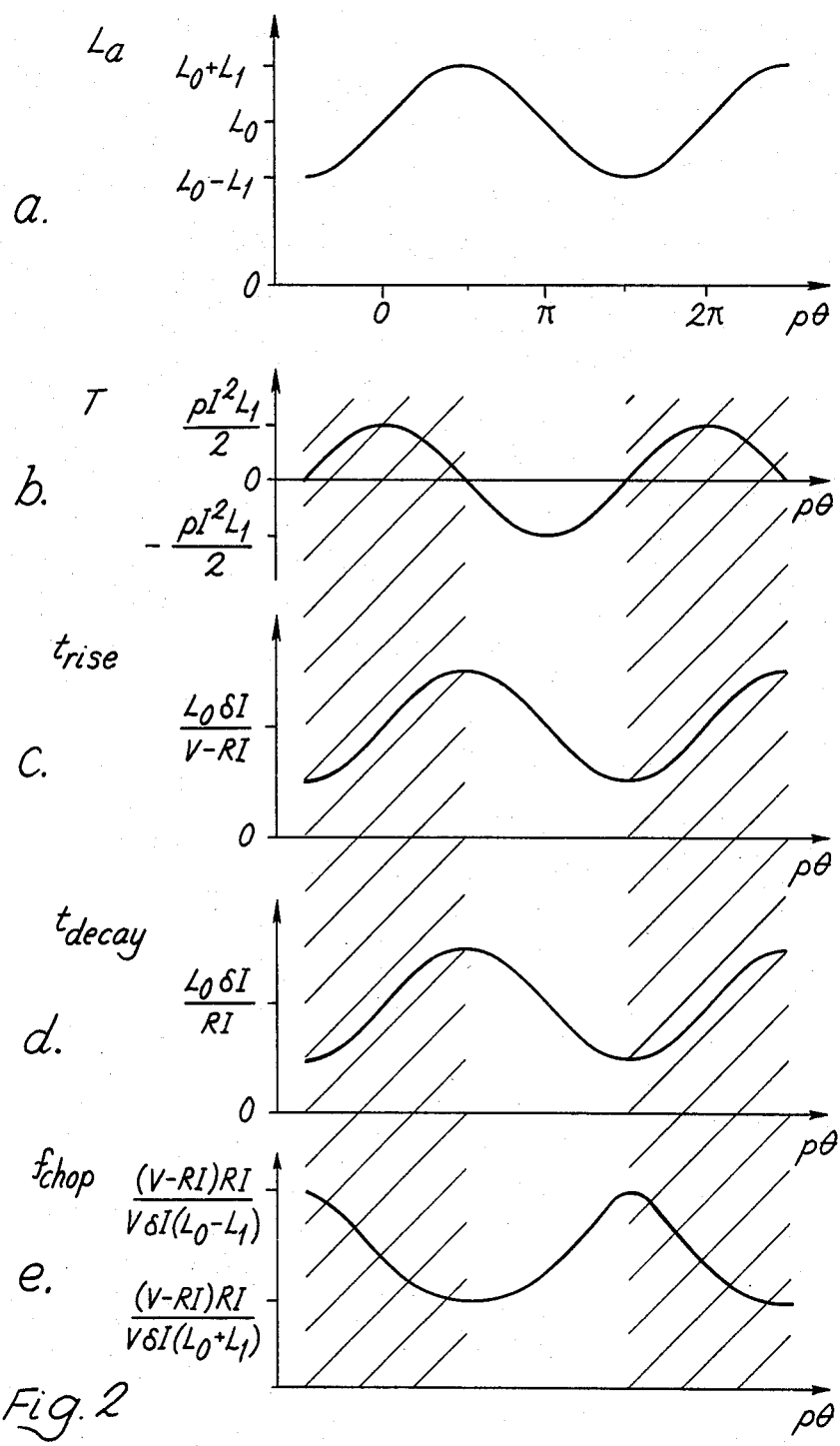
FIG. 2 shows calculated variations with rotor position for: (a) phase inductance, (b) phase torque, (c) rise time, (d) decay time, and (e) chopping frequency.

Of particular interest in FIG. 2 are the relationships between the torque produced by the phase shown at (b), the rise time shown at (c), the decay time shown at (d) and the chopping frequency shown at (e) at each rotor position. Suppose, for example, that the motor is accelerating, so each phase must produce maximum torque, and that the excitation scheme is chosen so that each phase is excited for half the total excitation cycle (the 'half-stepping' mode for three-phase motors). From FIG. 2(b) it can be seen that the phase being considered must be excited for rotor positions in the range $-\pi/2p < \theta < \pi/2p$. The corresponding variations of the chopping parameters over this range of rotor position in FIG. 2 in curves (c) to (e) show that the rise and decay times increase over the range and that the chopping frequency decreases over the range. So to detect the appropriate rotor position for the phase to be switched off it is sufficient, in this case, to find the maximum rise/decay time or minimum chopping frequency.

A similar argument can be applied to deceleration conditions in which the phase must produce negative torque, and for which the minimum rise/decay time or maximum chopping frequency must be detected.

The variations of phase inductance and chopping frequency with rotor position for a 3-phase, single-stack, 15° step-angle motor (p=8) were investigated experimentally using phase currents which were small (typically 5%) compared to the rated value. The results of FIG. 3(a) were obtained by measuring the inductance at 1 kHz of a phase winding on an ac bridge at various rotor positions. Although there is some small departure from the sinusoidal characteristic assumed in FIG. 2(a), it is possible to extract the constant and fundamental components of inductance variation, giving:

$L_o = 12.4$ mH
$L_1 = 4.2$ mH

This phase was then used in a chopper drive circuit having the following parameters:
i V=50 V
I=0.1 A
R=5.57 Ω
I=0.16 A The variation of chopping frequency with rotor position was measured over the complete range of position with the motor stationary, giving the results shown by the full line in FIG. 3(b). Also shown by a chain dotted line in FIG. 3(b) is the theoretical variation of chopping frequency obtained by substituting the inductance and drive parameters into equation (9). There is good agreement between theory and experiment at all chopping rates, even though the departure of the inductance variation from the assumed sinusoid has an evident effect.

In a well-designed variable-reluctance motor there is considerable saturation of the stator and rotor teeth in aligned position and therefore the effect of saturation on the chopping characteristics must be considered. At rotor positions where the iron teeth on the stator and rotor are fully aligned (e.g $\theta = \pi/2p$) the rate of change of flux linkage with phase current decreases rapidly as the rated current is approached, due to magnetic saturation; the incremental inductance of the phase is decreasing. Similar effects are observed over a wide range of rotor positions, because local saturation can occur at the tooth 'corners' even when the teeth are substantially out of alignment. However, as the rotor teeth approach positions at which they are completely mis-aligned with respect to the stator teeth (e.g. $\theta = 3\pi/2p$), the flux linkage/current characteristic becomes linear; saturation effects are eliminated, and the incremental inductance is constant (and equal to the average inductance) over the full current range.

These observations have implications for chopping characteristics. If the chopper drive is operating around the rated current level then the effective phase inductance for the small current excursions is the incremental inductance at rated current. At mis-aligned rotor positions, therefore, the chopping characteristics are independent of current level, because the incremental inductance is invariant. However at aligned rotor positions the incremental inductance decreases with increasing current and, referring back to equations (5), (7), (9), it can be seen that the current rise and decay times undergo a corresponding decrease and that the chopping frequency increases above the value predicted by the theoretical treatment above. Indeed, because the incremental inductance for aligned rotor positions is less than for the mis-aligned positions, the chopping frequency/-rotor position characteristic can be reversed with the maximum chopping frequency occurring when the stator/rotor teeth are fully aligned ($\theta = \pi/2p$).

Figure 4:
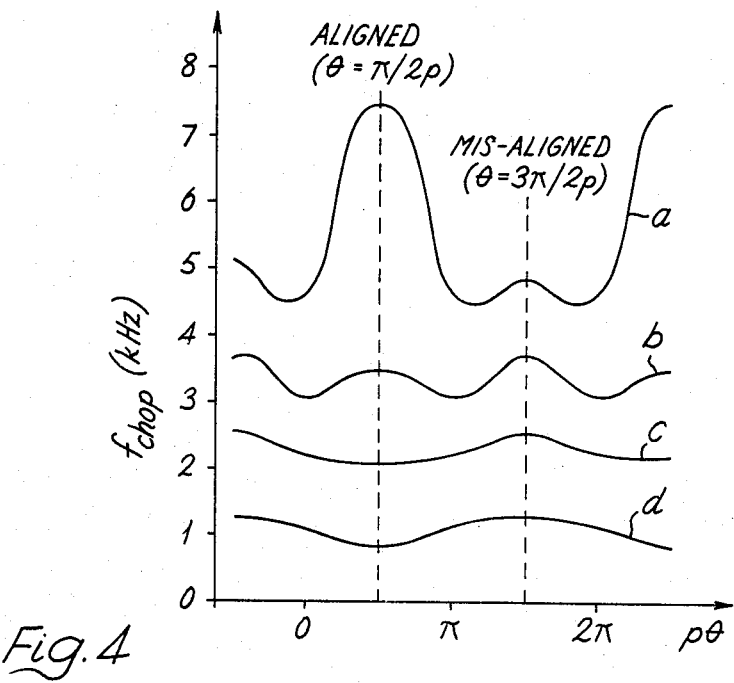

Experimental verification of these observations was obtained by operating the system described above at various current levels up to the motor's rated current. The results are illustrated in FIG. 4 at (a), (b), (c) and (d) all at a supply voltage V=50 volts for various average current levels I as follows:

|     | I amps | δ amps |
| --- | --- | --- |
| (a) | 1.40 | 0.30 |
| (b) | 0.72 | 0.20 |
| (c) | 0.33 | 0.07 |
| (d) | 0.10 | 0.16 |

Figure 3:
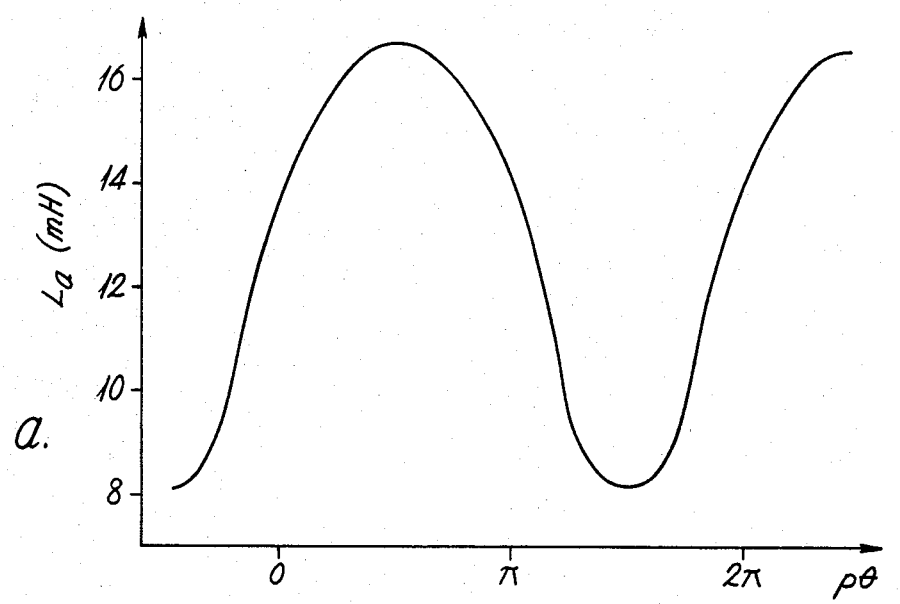
FIG. 3 shows (a) measured phase inductance variation, and (b) measured and calculated chopping frequency variation, with rotor position, FIG. 4 gives experimental results for chopping frequency/rotor position for various values of phase current.
Figure 3:
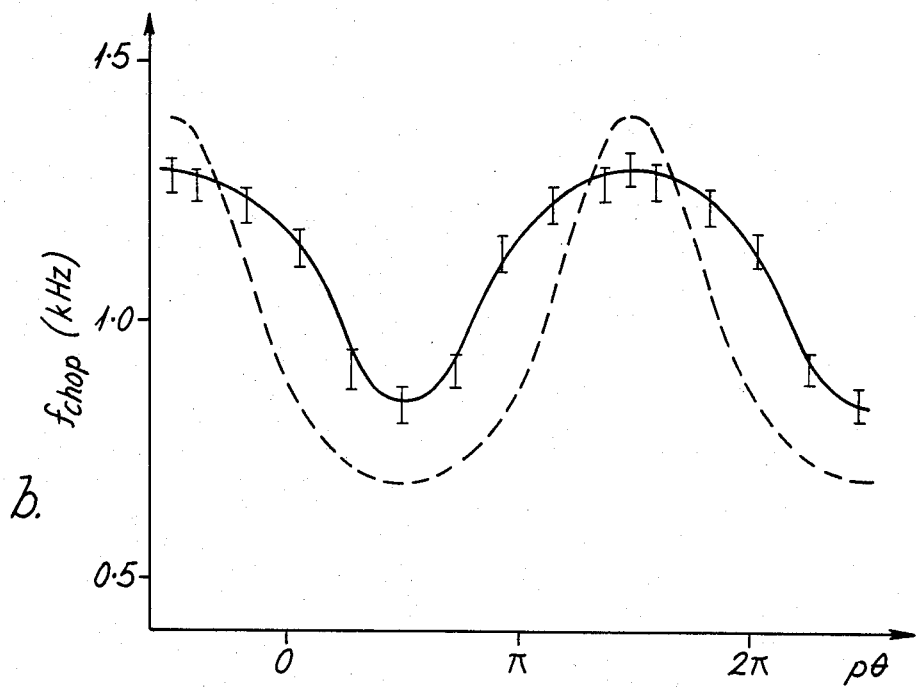

The results show a local maximum in the chopping rate at $p\theta = 3\pi/2$, which corresponds to the maximum predicted by the earlier theory (note: the absolute value of the frequency maximum has altered, by comparison to FIG. 3, because of the change in current level). However there is also a much larger maximum in this characteristic at the aligned teeth position ($p\theta = \pi/2$) because of the low incremental inductance.

Detection of rotor position is now subject to the additional complication that even within the range of rotor positions corresponding to positive torque production a given chopping frequency may indicate two rotor positions e.g. a frequency of 3.25 kHz for a current of 0.72 A (FIG. 4(b)) is obtained at $\theta/p = -20°$ and $\theta/p = +60°$. However any ambiguity in detected position can be eliminated quite simply by considering whether the chopping frequency is increasing or decreasing with rotor position.

The theoretical treatment of chopping characteristics presented above requires modification for operation at high speeds, where the motional emf, arising from flux linkages varying with rotor position, must be taken into account. Expressed algebraically the motional emf e is:

$$e = i dL_a/dt = I(dL_a/d\theta) \cdot \dot\theta \quad (10)$$

and substituting from equation (1):

$$e = pIL_1 \cos p\theta \cdot \dot\theta \quad (11)$$

This motional emf appears as an additional term on the right of the phase voltage equation (3):

$$V = Ri + L_a di/dt + e \quad (12)$$

At high speeds, therefore, the expressions for current rise time in equation (5) decay time in equation (7) and chopping frequency in equation (9) must be modified:

$$t_{rise} = (L_o + L_1 \sin p\theta)\delta I/(V - RI - e) \quad (13)$$

$$t_{decay} = (L_o + L_1 \sin p\theta)\delta I/(RI + e) \quad (14)$$

$$f_{chop} = (V - RI - e)(RI + e)/V\delta I(L_o + L_1 \sin p\theta) \quad (15)$$

As the motional emf, e, in equations 13-15 is itself a function of rotor position, the chopping characteristics are now complex functions of position and therefore may be less reliable as sources of position information. However the value of equations 13-15 lies not in this complexity (which would be worsened by including saturation effects), but in evaluating the potential of each characteristic for position detection.

In a practical chopper drive the high supply voltage is many times greater than the voltage required to circulate the rated current for continuous excitation, i.e. $V >> RI$. Referring to equation (14) it is apparent that the decay time is affected by the motional emf at speeds where this emf is comparable to the winding rated voltage ($e \simeq RI$) and, since this latter voltage is comparatively small, the decay time is affected at very modest speeds. However the denominator of equation (13) includes the factor $(V - RI - e)$ and since $V >> RI$ this factor can be approximated by $(V - e)$, so it is apparent that the rise time is only affected by the motional emf at the very high speeds where this emf is comparable in magnitude to the supply voltage. Therefore by using current rise for position detection a considerable degree of immunity from motional emf effects is obtained.

Figure 5:
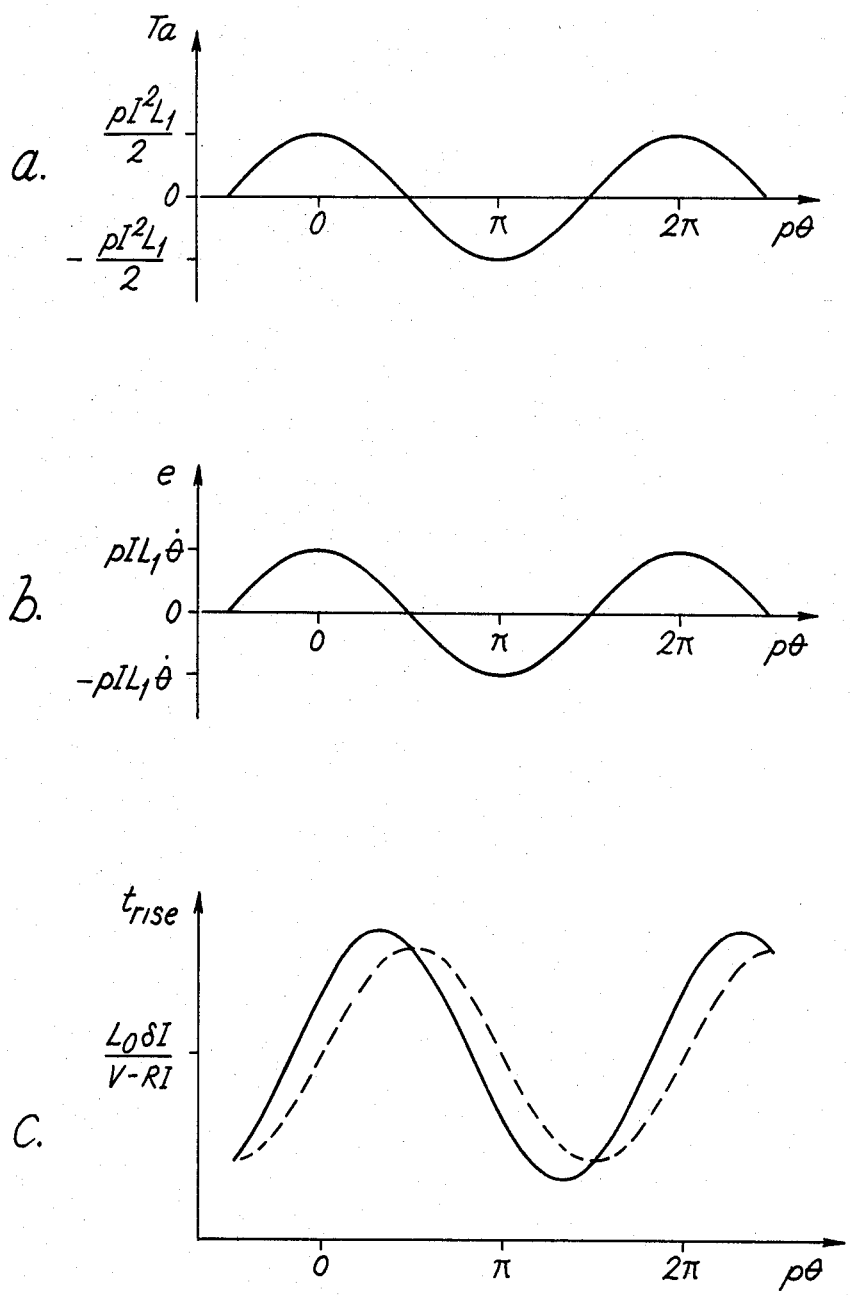
FIG. 5 shows at (a) torque, at (b) the effects of motional emf and at (c) rise time for low and high speeds.

Further immunity can be gained by correct choice of excitation scheme, as illustrated in FIG. 5, which shows at (a) the variation of torque, at (b) the motional emf and at (c) the rise time with rotor position. In FIG. 5(c) the chain dotted line is rise time at low speed and the full line is the rise time at high speed. Comparing FIGS. 5(a) and 5(b), it can be seen that the motional emf and torque have the same position variation, so that at positions where the torque is zero the motional emf is also zero. Therefore if the motor is accelerating or decelerating under maximum torque conditions, when each phase is excited for half of the total excitation cycle, it is necessary to detect rotor positions at which the motional emf is zero and therefore the current rise time is independent of speed. For instance, FIG. 5(c) shows that, even though the current rise time increases as the rotor passes through the region of positive torque production ($-\pi/2p < \theta < \pi/2p$) at increasing speeds, the current rise times at each end of the region ($\theta = -\pi/2p, \pi/2p$) are constant.

Should it be necessary to operate with a different excitation scheme (e.g. one-phase-on for a three-phase motor) the detected rotor position, for a fixed current rise time, would occur slightly earlier in the excitation cycle as speed increased. However this small error could be compensated, if necessary, by using the techniques for variation of switching angle described in an article entitled "Closed-loop control of stepping motors: prediction and realization of optimum switching angle," I E E Proc., Vol. 129, Part B, No. 4, July 1982.

From the above it is shown that the chopping characteristic on which the motional emf has least effect—and therefore the most reliable characteristic for position detection—is the current rise time. Depending on the chosen mode of excitation (one-phase-on, half-stepping etc.) and the degree of magnetic saturation present in the motor, the rise time corresponding to the rotor position being detected may occur at an earlier point in the phase excitation interval and it is then necessary to distinguish between increasing and decreasing rise times.

Figure 6A:
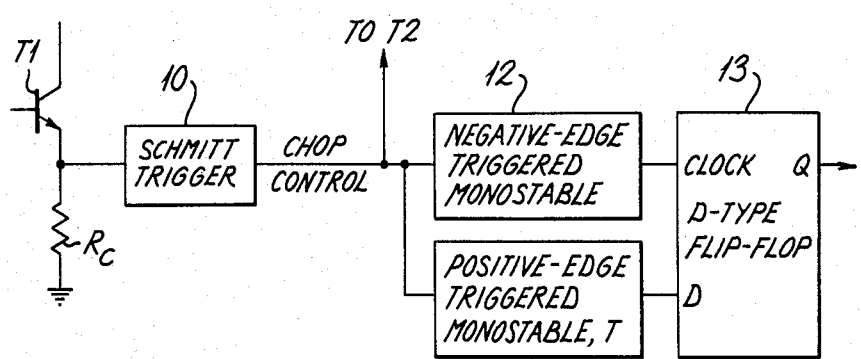
FIG. 6a is a diagram of a circuit for detecting when a rotor has reached a particular position.

A circuit suitable for the detection of a specified current rise time T is shown in FIG. 6a. The system monitors the chop control signal to determine the latest rise time, which is compared to the period of a positive-edge triggered monostable using a D-type flip-flop, producing a 'low' output if the latest rise time is longer than that specified.

The circuit of FIG. 6a comprises a Schmitt trigger circuit 10 the input of which is connected to the emitter of transistor T1 so as to receive the voltage Vc, representative of the instantaneous value of current from the supply terminals to winding A. The output of the Schmitt trigger is used as the chop control to switch off transistor T2. The threshold at which the Schmitt trigger 10 operates is predetermined to correspond to a maximum value of instantaneous phase current. The output of circuit 10 is also applied in parallel to two monostable circuits 11 and 12. Circuit 11 is triggered by the positive edge of its input pulse and remains 'high' for a period T. Monostable circuit 12 is triggered by negative or falling edge of the input pulse and is 'high' for a very brief period.

The outputs of circuits 11 and 12 are both fed to a D-type flip-flop circuit 13. The output of circuit 11 is fed to the D terminal input of circuit 13 while the output of circuit 12 is fed to the clock input of circuit 13. Circuit 13 provides an output at its Q terminal which is an indication of a predetermined rotor position.

Figure 6B:
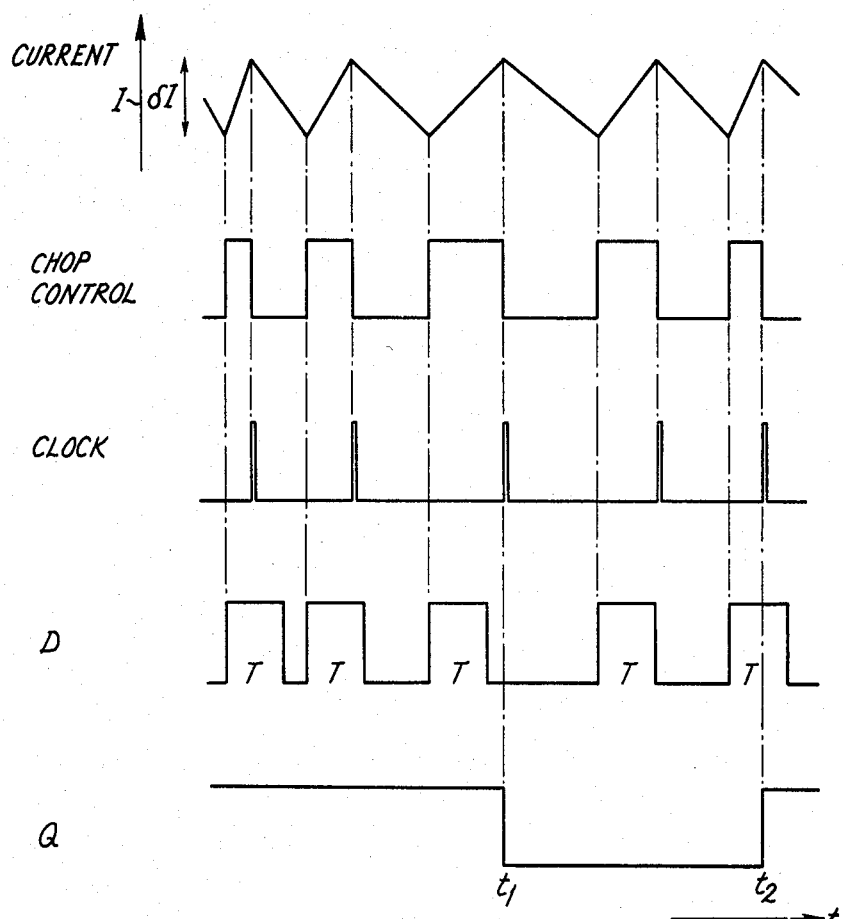
FIG. 6b shows waveforms explanatory of the operation of the circuit of FIG. 6a, FIG. 7 is a diagram illustrating an embodiment of the invention.

A complete cycle of operation is illustrated in the timing diagram of FIG. 6b, which has been made clearer by portraying operation at a much lower frequency than would be chosen in practice. At the beginning of the cycle the current rise time is short, so that output of positive-edge triggered monostable 11 is still 'high' when the current rise is complete. The transition of the chop control signal 'high' to 'low' produces a short duration pulse from the negative-edge triggered monostable 12 and this pulse acts as a clock signal for the D-type flip-flop 13, which, as its D input is also 'high', produces a 'high' output.

The circuit remains in this state until time $t_1$, when a current rise time longer than T occurs. The chop control signal 'high' to 'low' transition, and therefore the flip-flop clock pulse from circuit 12, now occur when the monostable output from circuit 11, and so the flip-flop D input, are 'low' so the flip-flop output changes 'high' to 'low'. After a further two chop cycles, however, at time $t_2$ the current rise time falls below T and flip-flop output returns to the 'high' state.

The system detects a specific rotor position determined by the period T of the positive-edge triggered monostable circuit 11. Where any ambiguity in detected position could occur it is a straightforward matter to ensure that the resulting excitation change is triggered by the appropriate transition of the D flip-flop output, since a 'high' to 'low' transition indicates that current rise times are increasing while a 'low' to 'high' transition indicates decreasing rise times.

Figure 7:
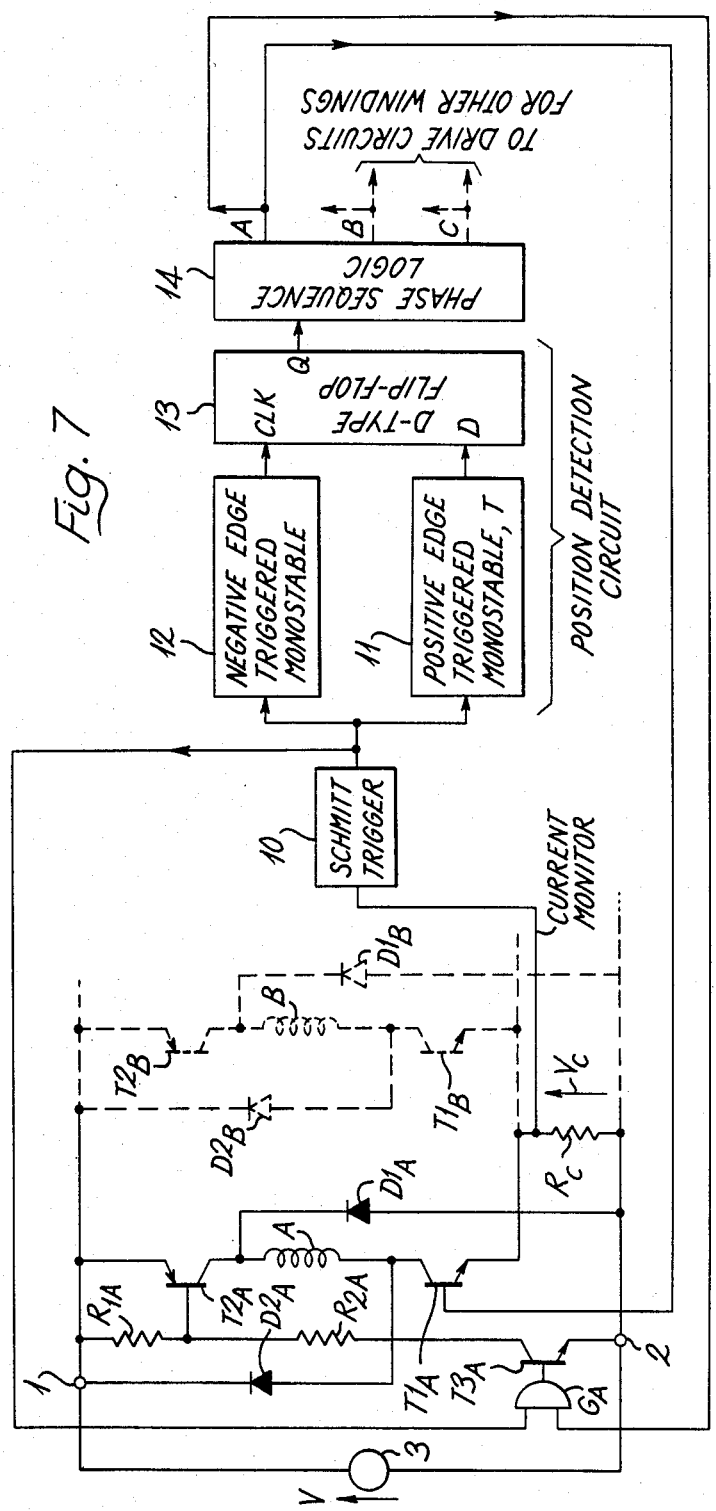

A circuit diagram illustrating an embodiment of the invention is shown in FIG. 7. A stepping motor has three phase windings A, B, and C of which winding A is shown in full line and winding B as a chain dotted line. The motor is designed to operate with each phase excited in sequence. The chopper drive circuit for phase winding A is as decribed with reference to FIG. 1 and like parts have similar reference numerals with the addition of a suffix 'A' where a part is specific to phase A. Phase winding A is connected to supply terminals 1 and 2 to which an unidirectional supply source 3 supplies a voltage V. Two transistors $T1_A$ and $T2_A$ are connected in series with winding A. The base electrode of transistor $T1_A$ is controlled from a phase sequence logic circuit 14 which has three outputs each of which is connected to an associated drive circuit of one of the phase windings A, B or C. Each output is energised in sequence to excite its associated phase. Transistor $T2_A$ acts as the chopping control and its base electrode is connected to the junction between two resistors $R1_A$ and $R2_A$ which form a potential divider chain and which is connected across terminals 1 and 2 through a transistor $T3_A$. The base electrode of transistor $T3_A$ is supplied from an AND gate $G_A$ the inputs to which are derived from Schmitt trigger circuit 10 and from the phase sequence logic circuit 14. By-pass circuits for the inductive energy for winding A when it is open circuited are provided by diodes $D1_A$ and $D2_A$ as described with reference to the FIG. 1 circuit.

Both of the other phase windings have associated with them components similar to the components described above and some of the components associated with phase winding B are shown in FIG. 7 by chain dotted lines. It should be noted, however, that all of the phase windings are returned to terminal 2 through a single resistor Rc the voltage across which provides an indication of the instantaneous current flow from supply source 3 and a current monitor connection is taken from resistor Rc to the Schmitt trigger 10 and the subsequent position detection circuits which are common to all phases and which have already been described with reference to FIGS. 6(a) and 6(b). It will also be understood that while a 3 phase stepping motor is shown in FIG. 7 the invention is equally applicable to stepping motor having any other number of phases.

In the circuit of FIG. 7, consider the situation where winding A is to be excited by a certain required current. The phase sequence logic produces a signal which is at logical level '1' on its A output line, the logical level of the other outputs being '0'. Transistors $T1_A$ is switched on by the logical '1' signal applied to its base (in some, high-power, situations it may be necessary to include one or more stages of switching amplification between the phase sequence logic and the base of transistor T1). The current flow through winding A causes a voltage drop across the small monitoring resistor Rc. If the current monitor level is below that corresponding to the required winding current then the Schmitt trigger 10 produces a logical '1' output. This output is passed to the AND gate, $G_A$, where it is gated with the phase sequence logic output A. In the situation, therefore, where winding A is to be excited and winding A current is below the required level, the gate $G_A$ produces a logical '1' output, which switches on transistor $T3_A$. With transistor $T3_A$ conducting the resistors $R1_A$ and $R2_A$ set the base potential of transistor $T2_A$ to a level where $T2_A$ is switched on. The full supply voltage V is then applied to the series combination of the winding A and resistor Rc.

The current in winding A increases until the required level is attained. The Schmitt trigger produces a logical '0' output and the output of gate $G_A$ changes to logical '0', hence turning off transistor $T3_A$. The base potential of transistor $T2_A$ rises to the high supply voltage, so this transistor also turns off. Current flow through the winding is maintained via a path which includes $T1_A$, Rc and $D1_A$. The current decays until the error between the actual and required current level is exceeded and the Schmitt trigger produces a logical '1' output, leading to the turn-on of $T2_A$ and a consequent rapid rise in winding current. The rates of winding current rise and decay during this cycle of operation are dependent on the effective winding inductance, which in turn, is dependent on rotor position in a machine with magnetic saliency.

The above description of the chopper drive of FIG. 7 so far refers to a principle which is well-known and widely-used. Additionally in the FIG. 7 circuit the Schmitt trigger output signal is used to detect rotor position and hence provide a suitable input signal for the phase sequence logic.

In the particular example illustrated in FIG. 7 the current rise time has been taken as the basis for position detection, but alternative implementations may utilize current decay time or chopping period or chopping frequency. At the beginning of the winding excitation interval the current rise time, when the Schmitt triger output is logical '1', is relatively short. The positive-edge triggered monostable 11 is triggered at the beginning of each rise time interval and initially will still have a logical '1' output at the end of the interval, when the '1' to '0' transition at the Schmitt trigger output triggers the negative-edge triggered monostable 12. This monostable's output acts as a clock signal for the D-type flip-flop 13, which has a logical '1' at its D input when the clock signal occurs and therefore produces a logical '1' output.

Later in the winding excitation interval the current rise times increase until they attain the period T of the positive-edge triggered monostable 11. In these circumstances the D-type flip-flop clock signal occurs after the output of the positive-edge triggered monostable 11 has fallen to logical '0', so the output D-type flip-flop 13 falls to logical '0'. This transition of the flip-flop output is arranged to occur at a rotor position where a change of winding excitation would be advantageous to motor operation.

The flip-flop output transition initiates a change in the outputs of the phase sequence logic circuit 14, so that, for example, output A changes to logical '0' and output B changes to logical '1', causing winding A to be switched off and winding B to be switched on. With phase sequence logic output A at '0' both $T1_A$ and $T2_A$ are switched off and the current in winding A decays via a path including diodes $D1_A$ and $D2_A$, but not including Rc.

In an alternative implementation of a chopper drive the current level in the winding is set by a single comparator and a monostable. When the current monitor reaches the comparator reference level transistor $T2_A$ is switched off for a fixed period determined by the monostable. During this fixed period the winding current decays to a level depending on the winding inductance. Detection of rotor position with this chopper drive may be implemented by monitoring the minimum current level during chopping, in addition to use of current rise time, chopping period or chopping frequency.

As an alternative to the detection of rotor position of a stepping motor by measurement of current rise time, or other current flow characteristic in an energized winding, it is possible to take measurements in an unenergized phase winding. During normal operation of the motor the current in such a winding would be zero but by setting the required current level to be a small fraction of the rated current of the motor, chopping behaviour can be measured without diminishing the torque producing capability of the motor from its energized winding. For chopping at currents of near zero value the variation of the phase incremental inductance with rotor position is a smooth near-sinusoidal curve and therefore continuous monitoring of rotor position is possible.

In this situation the phase current increases from zero to a small value and the voltage dropped across the winding resistance by this small current is negligible in comparison to the high dc supply voltage. Furthermore, the flux linkage with the winding tends to zero as the current approaches zero so that the rate of change of the flux linkage with rotor position and hence the motional emf can be neglected. When the small current in an unenergized winding, for example in phase winding A in FIG. 7, is chopped its natural decay is exponential with a long time constant since the free-wheeling path comprising transistor $T1_A$ and diode $D1_A$ has a high inductance and a low resistance. In the case of chopping at low current this slow current decay may be unacceptable if the rotor position is to be continuously monitored. However rapid current decay can be obtained by switching off both transistors $T1_A$ and $T2_A$ in an unenergised phase winding being used for monitoring and forcing the phase current back to zero by causing it to flow against the dc supply voltage via diodes $D1_A$ and $D2_A$.

If the time of current decay is being monitored the phase current does not flow through the current sensing resistor $R_C$ because transistor $T1_A$ is now non-conducting. Consequently the end of the decay interval cannot be found by detecting zero current in the current monitor $R_C$. To monitor the current an additional current sensing resistor may be inserted in series with diode $D1_A$ and similarly in series with the corresponding diodes in each of the other phase windings to detect the end of current decay directly.

Alternatively, it can be shown that the rise times and the decay times of current at a given rotor position in an unenergized winding are equal so that the drive transistors in the unenergised winding can be turned off for a time at least equal to the previous rise time.

Alternatively again, since the largest incremental inductance and therefore the longest decay times occur at the teeth-aligned position the transistors can be switched off for fixed times which are sufficiently long to ensure that current decay to zero is completed even in this position.

Stepping motors, and especially stepping motors of low power, may be driven by switching a constant voltage supply to even phase in sequence through phase resistors in series with each phase winding. At low speeds the current in an excited phase rises rapidly to the rated current level and subsequently the current gradient is zero so that it is not possible to detect rotor position from the current gradient in a turned-on phase. At high speeds the effects of motional emf produce a very different current waveform in which the changes of current gradient are a function of rotor position and speed.

As an alternative to monitoring the current throughout the period of excitation of a phase it is therefore possible to concentrate on measurements in a phase when it is first turned on. In this condition the phase current and flux linkage are both zero so that the resistive voltage drop and motional emf are negligible and therefore the initial rate of current rise is proportional to the applied voltage divided by the incremental inductance. This provides a well-defined unambiguous relationship between current gradient and rotor position independent of operating speed.

To implement closed loop control with a series resistance drive the next phase in the excitation sequence to the energized phase is repeatedly turned on and the initial gradient is measured. If the gradient matches the gradient obtained by turning on at the optimum rotor position for excitation change then this change is allowed to proceed. However, if the optimum position has not yet been obtained the current gradient is incorrect and the small phase current is reduced to zero in preparation for another attempt at turn on shortly.

Figure 8:
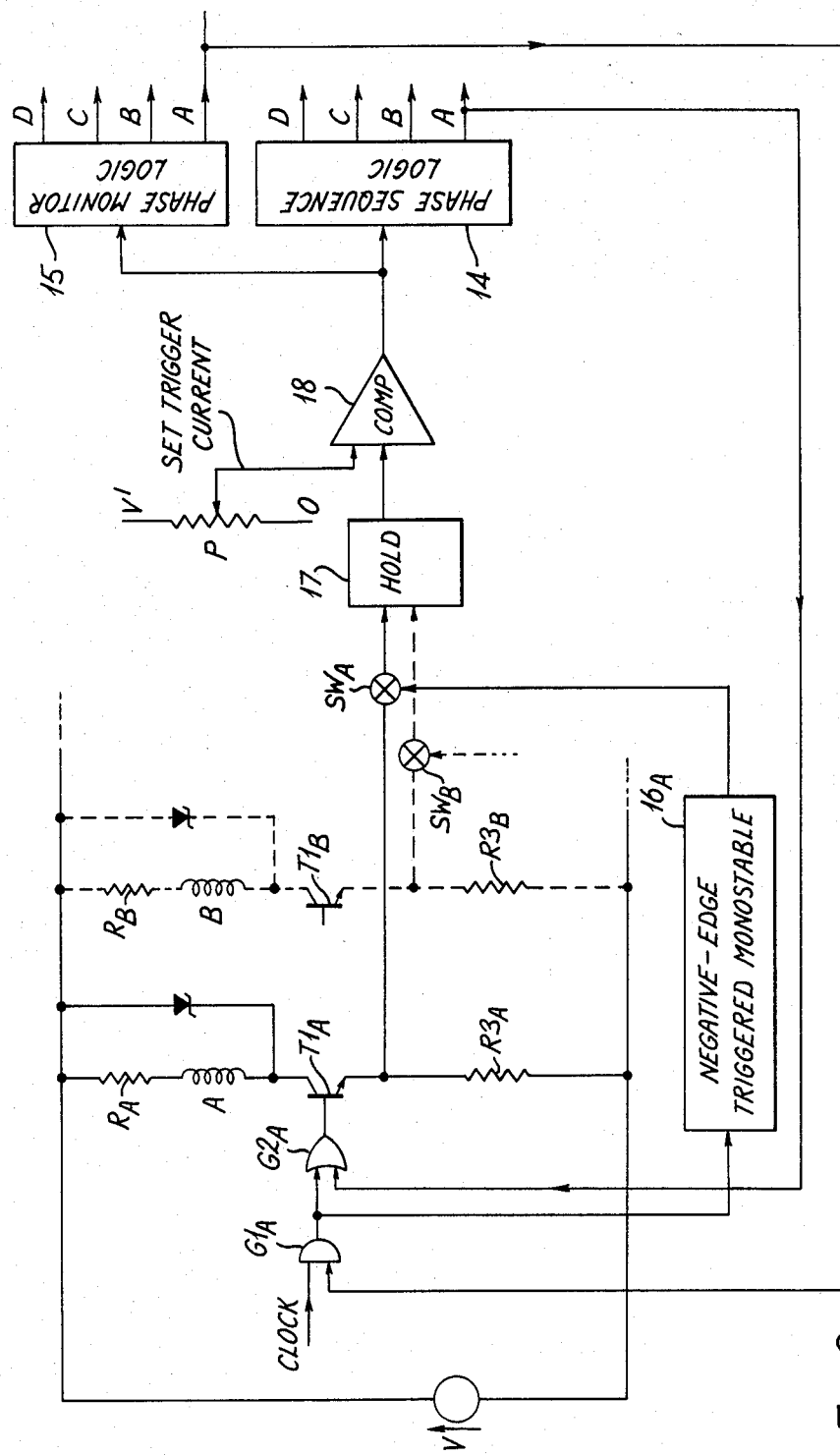
FIG. 8 is a diagram illustrating another embodiment of the invention.

An embodiment of the invention showing its application to a series resistance drive is illustrated in FIG. 8. In this Figure like parts have like reference numerals to FIG. 7. In FIG. 8 there is shown two phase windings A and B of a 4-phase stepping motor. There is a respective resistor $R_A$, $R_B$ in series with each winding. Current through the phase windings is controlled by individual phase transistors $T1_A$, $T1_B$ etc. in each phase and in addition in order to monitor the magnitude of the current through each phase winding small measuring resistors $R3_A$, $R3_B$ are included in the emitter circuits of the respective transistors $T1_A$, $T1_B$. Each transistor has its base electrode supplied through two logic gates. The logic gates $G1_A$ and $G2_A$ associated with phase A of the machine are illustrated in FIG. 8. $G2_A$ is an OR gate and $G1_A$ is an AND gate. $G2_A$ is supplied with one input from the output of gate $G1_A$ and another input from the phase sequence logic circuit 14 which corresponds to the similar referenced logic circuit in FIG. 7. A phase monitor logic circuit 15 is also provided which has four outputs A, B, C and D corresponding to the four phases of the stepping motor. Output A of circuit 15 is connected to the input of AND gate $G1_A$ which is also supplied with clock pulses. An output is taken from AND gate $G1_A$ to a negative-edge-triggered monostable circuit $16_A$ the output of which controls a switch $SW_A$ which is connected between the current monitoring resistor $R3_A$ and a hold circuit 17. Circuit 17 also has inputs from corresponding switches such as $SW_B$ connected to the other current monitoring resistors $R3_B$ etc. in the remaining phases. The output of hold circuit 17 is taken to a comparator 18 the other input of which is supplied from a preset voltage source V' through an adjustable potentiometer P. The output of comparator circuit 18 is taken both to the phase sequence logic circuit 14 and the phase monitor logic circuit 15.

In operation of the circuit shown in FIG. 8 phase sequence logic circuit 14 determines which phase or phases are excited at any one time. The phase monitor logic circuit 15 selects the next phase that is to be excited in the sequence. During a continuously excited phase a signal is provided from phase sequence logic circuit 14 to the relevant OR gate G2 and will therefore maintain the transistor T1 connected to that gate in a conducting state. No further input signal is required and the corresponding phase winding is excited for as long as an output is obtained from the phase sequence logic circuit 14 to that phase.

The phase monitor logic circuit 15 acts to monitor the phase which is about to be turned on and it provides a signal to the AND gate G1 of that phase, for example AND gate $G1_A$ if it is phase A which is being monitored. A clock pulse train is continuously provided to the AND gates of every phase and the rate of this clock signal is set to be very much higher than the stepping rate of the motor. When AND gate $G1_A$ is enabled from phase monitor logic circuit 15 the clock pulses will pass through both AND gate $G1_A$ and OR gate $G2_A$ to switch phase switching transistor $T1_A$ on and off at a high rate.

At each turn on of the phase the current through the phase winding is allowed to increase for a fixed time determined by the clock pulse length. The value of current attained at the end of this fixed time is therefore indicative of the rate of current rise and hence of rotor position. Negative-edge-triggered monostable circuit $16_A$ is triggered by the trailing edge of each clock pulse from enabled AND gate $G1_A$ to close switch $SW_A$ connected to the phase current monitoring resistor. The value of the phase current as indicated by the voltage on the current measuring resistor $R3_A$ is thus applied to the hold circuit 17 which will hold this value and allow it to be compared in the comparator 18 with a predetermined value of voltage from potentiometer P. If this preset value is reached or exceeded the comparator provides an output signal both to the phase sequence logic circuit 14 to switch the energization to the next phase and likewise to the phase monitor logic circuit 15 to start monitoring the next phase after that.

We claim:

1. A drive circuit for a stepping motor having at least one stator phase winding comprising:
   phase switching means associated with said at least one phase winding for switchably connecting said at least one phase winding to supply terminals;
   phase control means for operating the phase switching means;
   means for repeatedly chopping the electrical connection from the supply terminals to said at least one phase winding when current flow in such phase winding has risen to a predetermined value;
   a by-pass circuit associated with each of said at least one phase winding for allowing current flow through the winding to decay when the chopping means operates;
   means for restoring the electrical connection from the supply terminals to said at least one phase winding after a delay time;
   means for measuring a characteristic of current flow in the motor to derive an indication of rotor position, said characteristic being selected from the group of characteristics comprising current rise time, current decay time and chopping frequency; and
   means for utilizing the value of the characteristic measured in said measuring means to operate the phase control means.

2. A drive circuit for a stepping motor having a plurality of phase windings comprising:
   phase switching means associated with each one of said plurality of phase windings for switchably connecting each phase winding to supply terminals;
   phase control means for operating the phase switching means;
   means for repeatedly switching current to an unenergized phase winding of said plurality of phase windings;
   means for switching off said current when it has reached a predetermined low value;
   means for measuring the time for such current to rise to said value, said measured time being indicative of rotor position; and
   means for utilizing the value of said measured time to operate the phase control means.

3. A drive circut as claimed in claim 1 in which the delay time is the time required for the current to decay to a predetermined value.

4. The drive circuit as claimed in claim 1 in which the characteristic of current that is measured is a characteristic of current flow through an energized phase winding.

5. The drive circuit as claimed in claim 1 in which the characteristic of current flow that is measured is a characteristic of current flow at a low level through an unenergized phase winding.

6. The drive circuit as claimed in claim 2 in which switching means are provided for switching a constant voltage supply to each phase winding in sequence.

* * * * *